United States Patent

[11] 3,541,940

[72] Inventors Henry J. Bartnick;
Hubert Nerwin, Rochester, New York
[21] Appl. No. 685,687
[22] Filed Nov. 24, 1967
[45] Patented Nov. 24, 1970
[73] Assignee Eastman Kodak Company
Rochester, New York
a corporation of New Jersey

[54] CARTRIDGE FOR DISPENSING AND STORING RADIATION SENSITIVE UNITS
28 Claims, 6 Drawing Figs.
[52] U.S. Cl. .................................................. 95/30,
95/13; 250/68
[51] Int. Cl. .......................................................G03b 19/10,
G03b 17/52
[50] Field of Search............................................ 95/13, 19,
26, 30; 250/66, 68; 96/67(Consulted)

[56] References Cited
UNITED STATES PATENTS
| | | | |
|---|---|---|---|
| 308,781 | 12/1884 | Menns.......................... | 250/66X |
| 622,402 | 4/1899 | Stark............................ | 95/30 |
| 1,557,085 | 10/1925 | Piller............................ | 95/30 |
| 1,823,321 | 9/1931 | Hammond..................... | 95/30 |
| 2,056,279 | 10/1936 | Kulick........................... | 250/68 |
| 2,463,878 | 3/1949 | Johnson........................ | 95/30X |
| 2,873,658 | 2/1959 | Land............................. | 95/13 |
| 3,412,244 | 11/1968 | Sherwood..................... | 250/68 |

*Primary Examiner*—John M. Horan
*Assistant Examiner*—Robert P. Greiner
*Attorneys*—Robert W. Hampton, Gary D. Fields and D. Peter Hochberg

ABSTRACT: A cartridge for supplying radiation-sensitive units to an exposing device such as a camera of the so-called self-developing type. The cartridge comprises a container having unit supporting elements and an opening through which a reciprocative mechanism of the exposing device can sequentially transport the units to an exposure position and preferably also to a processing position. The cartridge is also adapted to receive and store such units after they have been exposed and processed, and for this purpose has a divider delimiting chambers for unexposed and exposed units. Slots and guiding elements are provided for facilitating dispensing and receiving such units respectively.

Patented Nov. 24, 1970
3,541,940
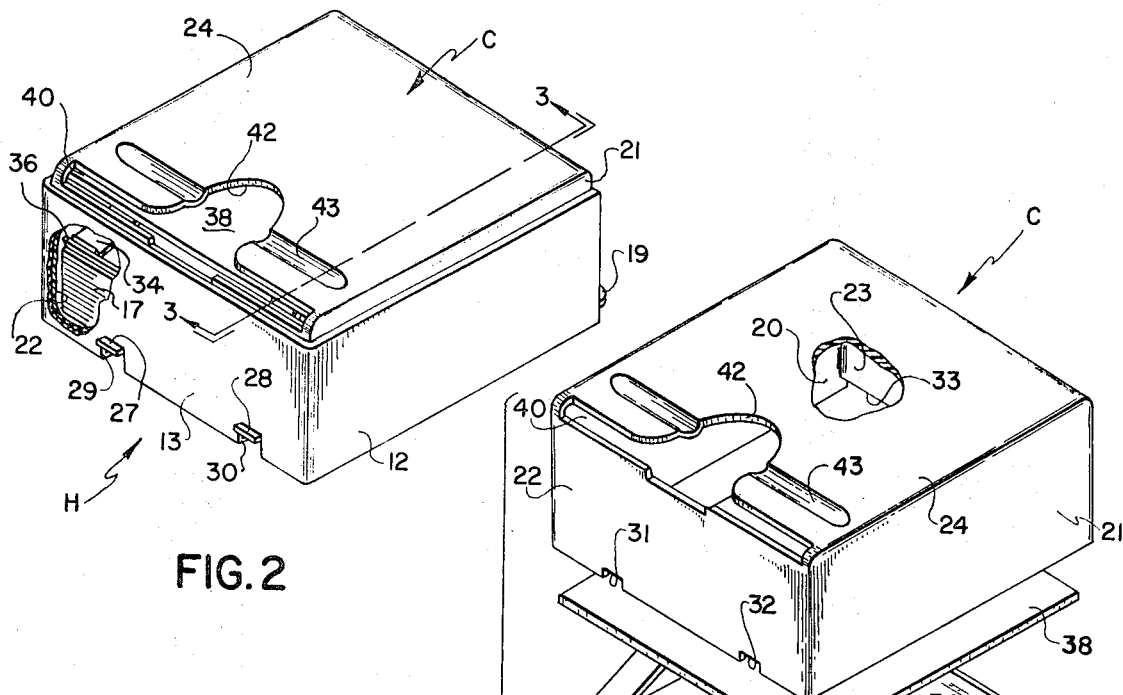
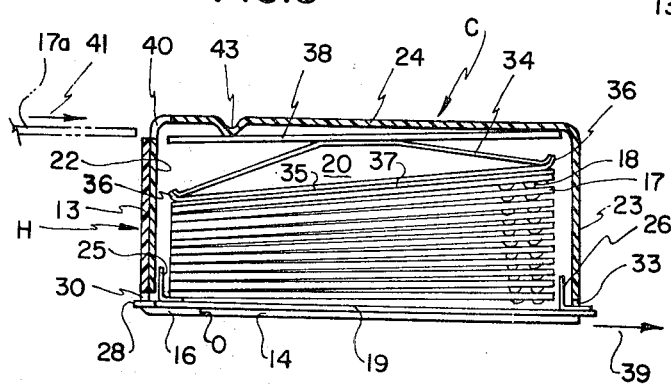
HENRY J. BARTNICK
HUBERT NERWIN
INVENTORS
BY Gary D. Fields
Robert W. Hampton
ATTORNEYS

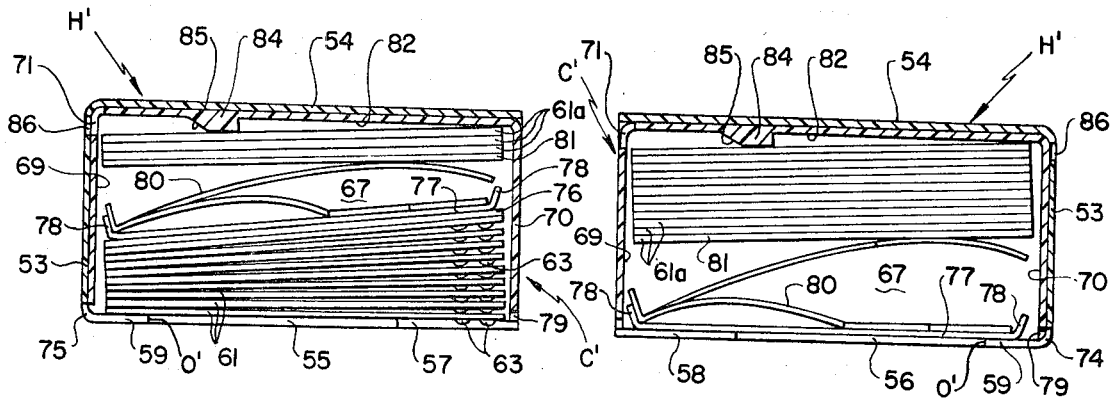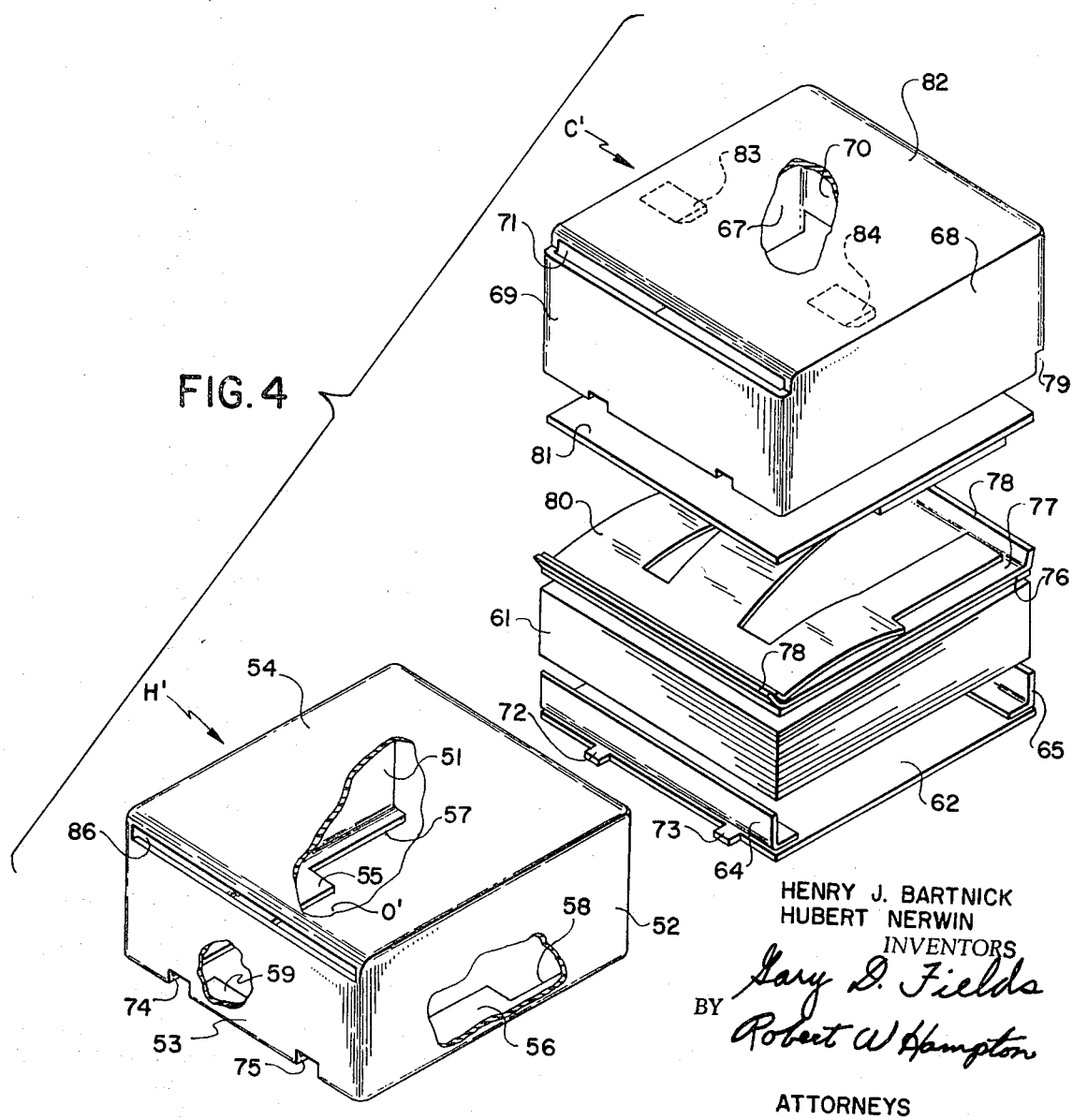

3,541,940

CARTRIDGE FOR DISPENSING AND STORING RADIATION SENSITIVE UNITS

CROSS REFERENCE TO RELATED APPLICATIONS

The cartridge of this invention could be utilized in the camera disclosed in the copending U.S. Pat. application of Hubert Nerwin, Ser. No. 675,597, for supplying slide transparency units of the type disclosed in the copending U.S. Pat. application of Hubert Nerwin, Ser. No. 675,608, both filed Oct. 16, 1967.

BACKGROUND OF THE INVENTION

1. Field of the Invention

This invention relates to a cartridge or magazine for radiation-sensitive units, and more particularly to such a cartridge for supplying unexposed slide transparency units to a camera for exposure and processing therein and for storing such units after they have been so exposed and processed.

2. Description of the Prior Art

A film pack is disclosed in U.S. Pat. No. 3,225,671 to Friedman which is adapted to provide a plurality of slide transparency units within a camera, each transparency unit having a separate leader for transporting the unit from the cartridge to a processing chamber within the camera. The film pack there disclosed is not usable, however, within a camera having a slide or pusher for advancing the transparency units, nor are means there provided for storing the transparency units after they have been processed.

SUMMARY OF THE INVENTION

In accordance with this invention, a cartridge is provided for supplying radiation-sensitive units to an exposing device that has a reciprocative mechanism adapted to sequentially transport such units from the cartridge to an exposure position in the device. The cartridge comprises a container having means for supporting a stack of radiation-sensitive units in the container, means for providing access to the supported stack by the reciprocative mechanism in the exposing device, and means for defining an exit opening in the container through which units in the stack can be sequentially removed from the container by the reciprocative mechanism. The cartridge may include means for defining a receiving opening in the container and means for defining a a storage chamber communicating with the receiving opening to receive and store the radiation-sensitive units after they have been exposed.

In the two illustrated embodiments of this invention, the cartridge is adapted to contain a plurality of unexposed slide transparency units for sequential removal by a cooperating reciprocative mechanism in an associated photographic camera so as to be subsequently exposed and processed in the camera, the cartridge being further adapted to receive and store the slide transparency units after they have been exposed and processed.

In the preferred embodiment illustrating the cartridge of this invention, a generally U-shaped housing, which has at least one wall portion, is provided for supporting a stack of unexposed slide transparency units within a boxlike enclosure or cover, which similarly has at least one wall portion and also a top portion. The unexposed transparency units are urged toward an access opening in the housing by resilient means such as a spring member within the cover. The unexposed transparency units can be sequentially removed from the cartridge by means of a reciprocative slide or pusher mechanism in an associated camera having fingers that engage an edge of each unexposed transparency unit to move the unit through any exit opening or slot in the cartridge into an exposure chamber in the camera. A divider means within the cover divides the cartridge into a storage chamber and a supply chamber, a receiving opening or slot being provided in the cover through which exposed and processed transparency units can be received for storage in the storage chamber. Deflection means within the cover ensure that the receiving opening or slot is always clear of any previously received unit so that succeeding units can be inserted easily therethrough into the storage chamber.

An alternative embodiment is provided wherein the cover has a top that is closed and a wall having a slot in alinement with a receiving slot in the housing when the cartridge is being used to supply unexposed transparency units to a camera. The cover and the housing can be reversed in their orientation so as to form a substantially enclosed, permanent storage container for exposed and processed transparency units after the cartridge has been removed from the camera.

Additional features of this invention will become apparent in the description of the illustrated embodiments presented below in conjunction with the accompanying drawings.

BRIEF DESCRIPTION OF THE DRAWINGS

FIG. 1 is an exploded view of the preferred embodiment of a cartridge constructed in accordance with this invention;

FIG. 2 is a perspective view of the cartridge of FIG. 1 in assembled condition, with parts broken away to show the arrangement of slide transparency units contained therein;

FIG. 3 is a longitudinal section, taken along line 3-3 of FIG. 2, illustrating how unexposed transparency units are removed from the cartridge and how exposed and processed transparency units are placed in the cartridge for storage;

FIG. 4 is an exploded view of an alternative embodiment of a cartridge constructed in accordance with this invention, with parts broken away for clarity of illustration;

FIG. 5 is a longitudinal section through the cartridge of FIG. 4, showing the position of both unexposed and processed transparency units within the cartridge, as when the cartridge is in a camera; and FIG. 6 is a horizontal section, similar to FIG. 5, showing the arrangement of the cartridge parts after all of the transparency units have been exposed and processed and the cartridge has been removed from the camera for use as a permanent storage container for the exposed and processed transparency units.

DESCRIPTION OF THE ILLUSTRATED EMBODIMENTS

In accordance with the preferred embodiment of this invention, a cartridge is provided, as shown in FIGS. 1—3, which includes a generally U-shaped housing H having spaced sidewalls 11 and 12 interconnected by an end wall 13. Sidewalls 11 and 12 are provided with inwardly extending flanges 14 and 15, respectively, while end wall 13 is provided with an inwardly extending flange 16, for supporting a stack of unexposed transparency units 17, each having spaced pods 18 containing processing agents, upon a blank 19. Flanges 14, 15, and 16 define an access opening O in housing H through which a reciprocative slide mechanism in an associated camera can extend to sequentially transport the unexposed transparency units from the cartridge to an exposure chamber in the camera. A generally rectangular cover C is adapted to be received between the walls of housing H in interlocking or frictional engagement therewith, as seen in FIGS. 2 and 3, to form an enclosure for the transparency units. Cover C includes two spaced sidewalls 20 and 21 interconnected by end walls 22 and 23 and top wall 24. Blank 19 has two spaced, angular, upwardly extending, opaque baffles 25 and 26 to prevent light from entering the enclosure and thereby fogging the transparencies prior to insertion of the cartridge in the camera. At one end of blank 19 is a pair of spaced ears or tabs 27 and 28, which are received in notches 29 and 30, respectively, of housing H and in notches 31 and 32, respectively, of cover C. Notches 29, 30, 31, and 32 are disposed as shown to provide clearance for, and thereby facilitate movement of, corresponding portions of the camera reciprocative slide mechanism. The other end of blank 19 extends into an exit opening or slot 33 in end wall 23 of cover C. Thus, blank 19 is long enough so that opposite end portions thereof can extend through suitable openings in corresponding opposite end walls of the cartridge, thereby preventing blank 19 from being pushed upwardly into the cartridge prior to insertion of the cartridge in the camera. Consequently, unexposed transparency units in the cartridge cannot be crushed easily, and pods 18 cannot, therefore, be ruptured easily prior to their removal from the cartridge for exposure and processing.

Transparency units 17 are urged toward flanges 14, 15 and 16 by a resilient means such as leaf spring 34, which engages a pressure pad 35 having upturned ends 36. Below pressure pad 35 is a follower means or second blank 37, riding on and following the stack of units 17, which is used to push the last transparency unit out of the camera, as described below. A divider 38 is provided between leaf spring 34 and top wall 24 to divide the cartridge into a supply chamber and a storage chamber, as discussed more fully below.

After the cartridge is inserted in a camera, such as the camera shown in commonly assigned copending U. S. Pat. application Ser. No. 675,597, filed Oct. 16, 1967 in the name of Hubert Nerwin, a transport mechanism within the camera, such as one having a reciprocative slide member, is moved beneath the cartridge, as viewed in FIG. 3, until fingers or hooks on such a member engage ears 27 and 28 on blank 19, so that the slide member can then move blank 19 out of the cartridge through exit slot 33, as indicated by arrow 39 in FIG. 3, into an exposure chamber in the camera. Baffles 25 and 26 are attached to blank 19, as shown, so that they can fold down flat to facilitate their passage through slot 33. A second actuation of the slide member causes the fingers thereon to enter slots 29 and 30 and engage an edge of the first unexposed transparency unit in the stack, so that the slide member can then move that unit out of the cartridge, through exit slot 33, and into the exposure chamber in the camera, the unit simultaneously pushing blank 19 out of the camera through a suitable opening in the camera housing. After exposure of the first exposed transparency unit, a third actuation of the camera slide member similarly moves the second unexposed transparency unit from the cartridge into the camera exposure chamber, the second unit simultaneously pushing the exposed first unit out of the camera. The processing agents in the pods of the exposed unit are spread across the transparency of that unit while such unit is in the camera exposure chamber during the above-described reciprocative movement of the slide member.

When the last unexposed transparency unit in the stack has been exposed, subsequent actuation of the camera slide member will move blank 37 from the cartridge into the camera exposure chamber, thereby pushing the last transparency unit out of the camera. Conveniently, blank 37 could be provided with suitable indicia that could be viewed through a window in the camera to indicate that the cartridge is empty. Further actuation of the camera slide member will be ineffective because the upturned ends 36 of pressure pad 35 would then prevent positive engagement of pad 35 by the fingers on the camera slide member. Also, upturned ends 36 could be made sufficiently long so that pressure pad 35 could not pass through slot 33.

After a transparency unit has been exposed and processed, it can be placed in the cartridge for storage by inserting it in the cartridge through a receiving opening or slot 40 in cover C, as indicated by arrow 41 in FIG. 3, after which the inserted unit is prevented from rattling by leaf spring 34 bearing against divider 38. Top 24 of cover C has a recess 42, which serves to facilitate insertion of an exposed and processed transparency unit through slot 40, and also a deflection means such as transverse depending rib 43, which serves first to deflect the leading end and then to maintain the trailing end of each inserted transparency unit below slot 40, thereby permitting insertion of succeeding exposed and processed transparency units through slot 40 without interference by those units already inserted. Thus, succeeding exposed and processed transparency units 17a can be readily inserted in the storage chamber provided between top 24 and divider 38. After all of the unexposed transparency units 17 in the stack have been exposed and processed, the cartridge can be removed from the camera and used as a permanent storage container for exposed and processed transparency units. To provide a more fully enclosed container for this purpose, cover C can be reversed in its orientation with housing H so that slot 33 then abuts end wall 13.

Shown in FIGS. 4—6 is an alternative embodiment of a cartridge constructed in accordance with this invention, which also is usable as a storage container for exposed and processed slide transparency units after the cartridge is removed from the camera. As best seen in FIG. 4, a boxlike housing H' is provided which includes a pair of spaced sidewalls 51 and 52 interconnected by an end wall 53 and a top wall 54. Sidewalls 51 and 52 terminate at their lower portions with inwardly extending flanges 55 and 56, respectively, having open portions 57 and 58, respectively, adapted to receive a portion of a reciprocative slide mechanism within an associated camera. The lower portion of rear wall 53 terminates with an inwardly extending flange 59. Flanges 55, 56, and 59 serve to support a stack of unexposed transparency units 61 upon a blank 62, as described below, and also to define an access opening O' in housing H' through which the camera slide mechanism can extend to sequentially transport unexposed transparency units from the cartridge to an exposure chamber in the camera.

A plurality of unexposed transparency units 61 having spaced pods 63, which supply processing agents for development of an exposed transparency unit, are supported on blank 62, which has angular, upturned baffles 64 and 65 at its opposite ends to protect the unexposed transparency units from exposure to light prior to insertion of the cartridge in the camera. A cover C', which is adapted to fit over and enclose transparency units 61 and blank 62, is provided with spaced side walls 67 and 68 interconnected by end walls 69 and 70 and a top wall 82. End wall 69 is provided with a receiving opening or slot 71 through which exposed and processed transparency units 61a can be inserted for storage in the cartridge, as best seen in FIG. 5. Blank 62 has, at one end thereof, a pair of spaced ears 72 and 73 which are adapted to engage notches 74 and 75, respectively, in end wall 53 of housing H' and corresponding notches in cover C'. As in the previously described embodiment, these notches are disposed as shown to provide clearance for, and thereby facilitate movement of, corresponding portions of the camera reciprocative slide mechanism. The opposite end of blank 62 extends into an exit opening or slot 79 in cover C' so that blank 62 cannot easily be pushed upwardly into the cartridge, thereby substantially preventing any crushing of transparency units 61 and consequent rupturing of pods 63 by the user prior to insertion of the cartridge in the camera. At the upper end of the stack of unexposed transparency units 61 is a follower means or blank 76, riding on and following the stack, which is adapted to push the last of such units out of the camera after its exposure and processing, as in the previously described embodiment. Above blank 76 is a pressure pad 77 having upturned ends 78 which prevent pad 77 from being pushed through exit slot 79 in cover C' by fingers on the camera slide mechanism that sequentially engage blank 62 and the unexposed transparency units to sequentially transport blank 62 and the unexposed transparency units to the camera exposure chamber. Above pressure pad 77 is a resilient means such as leaf spring 80 for urging the unexposed transparency units 61 toward access opening O' of housing H'. A divider 81 provided between leaf spring 80 and top wall 82 divides the cartridge into a supply chamber and a storage chamber as in the preceding embodiment.

The top wall 82 of cover C' includes a pair of depending lugs 83 and 84, spaced from receiving slot 71, which include cam surfaces, such as cam surface 85 on lug 84, as seen in FIG. 5, which deflect the leading end of an exposed and processed transparency unit 61a as it is inserted through slot 71 and through a corresponding slot 86 in housing H', causing the inserted unit to be deflected downwardly under the lugs. Thus, the trailing end of each inserted transparency unit is maintained below slot 71 so that the next exposed and processed transparency unit can easily be inserted through slots 71 and 86 without interference by those units already inserted.

After all of the unexposed transparency units 61 have been moved sequentially through exit slot 79, the slide mechanism within the camera will cause blank 76 to be moved into the exposure chamber of the camera to push the last of transparency units 61 out of the camera. As in the previous embodiment, blank 76 could be provided with suitable indicia to indicate that no more transparency units are in the camera. Pressure pad 77 will be prevented from being moved out of the cartridge through exit slot 79 by upturned ends 78. After the cartridge is removed from the camera, housing H' can be separated from cover C', its orientation reversed from that shown in FIG. 5, and then placed over cover C' so that it assumes the position shown in FIG. 6. This reversed arrangement causes exit slot 79 of cover C' to be covered, thereby providing a more fully enclosed cartridge for storing exposed and processed transparency units 61a.

From the foregoing description it can be seen that the novel features of this invention are significant. In both of the illustrated embodiments a cartridge for containing both unexposed transparency units and exposed and processed transparency units has been provided. In addition, the cartridges of both embodiments can be used within a camera having a slide mechanism for transporting the unexposed transparency units successively into an exposure chamber in the camera. Furthermore, a spring mechanism is provided within the cartridge which serves the dual function of urging the unexposed transparency units toward the slide mechanism in the camera and holding the exposed and processed transparency units in a fixed position so they do not rattle. A cam surface is provided in the cartridge cover near a slot for receiving exposed and processed transparency units which causes the leading end of each received unit to be deflected downwardly upon its insertion and then causes the trailing end thereof to be maintained below the receiving slot so that the next succeeding transparency unit can be inserted easily therethrough into the cartridge. Furthermore, either the housing or the cover of the cartridge can be reversed after the transparency units have all been exposed and processed and the cartridge then used as a permanent storage container for exposed and processed transparency units.

The invention has been described in detail with particular reference to preferred embodiments thereof, but it will be understood that variations and modifications can be effected within the spirit and scope of the invention.

We claim:
1. A cartridge for supplying to a camera a stack of unexposed film units which are adapted to be exposed and to have their processing initiated by the camera, the camera having a reciprocative mechanism adapted to sequentially transport the unexposed film units from said cartridge to an exposure chamber in the camera, said cartridge comprising:
   a container including:
      four sidewalls, at least two of said sidewalls being in an opposed relationship;
      a top wall interconnecting said sidewalls, and support means connected to at least one of said sidewalls for supporting a stack of unexposed film units in said cartridge, said support means defining an opening in said container through which the reciprocative mechanism in the camera is adapted to extend to sequentially transport the unexposed film units from said cartridge;
      means defining an exit slot in one of said opposed sidewalls adjacent to said support means through which the unexposed film units are sequentially transportable from said cartridge for exposure and for having their processing initiated by the camera;
      means defining a receiving slot in the side wall opposed to said one side wall for receiving exposed and processed film units for storage; and
      light-lock means in said cartridge for preventing light from entering said cartridge prior to insertion of said cartridge in the camera.

2. A cartridge as set forth in claim 1 further including: resilient means within said cartridge for urging the unexposed film units toward said support means.

3. A cartridge as set forth in claim 1 further including:
   a movable blank disposed in said cartridge relative to the unexposed film units so as to be transported by the camera reciprocative mechanism from said cartridge after the last of the unexposed film units has been transported from said cartridge in order to push the last unit out of the camera after exposure of that unit; and
   resilient means between said blank and said top wall for urging the unexposed film units toward said support means.

4. A cartridge for supplying to a camera a stack of unexposed slide transparency units which are adapted to be exposed and to have their processing initiated by the camera, the camera having a reciprocative mechanism adapted to sequentially transport the unexposed transparency units from said cartridge to an exposure chamber in the camera, said cartridge comprising:
   a housing including:
      generally parallel housing sidewalls;
      a housing end wall interconnecting said housing sidewalls; and
      abutment means connected to at least one of said housing walls for supporting a stack of unexposed slide transparency units in said cartridge and defining an opening in said housing through which the reciprocative mechanism in the camera is adapted to extend to sequentially transport the unexposed transparency units from said cartridge for exposure and for having their processing initiated by the camera;
   a cover including:
      two-spaced cover sidewalls;
      two-spaced cover end walls interconnecting said cover sidewalls;
      a cover top wall interconnecting said cover sidewalls and said cover end walls, said cover being engageable with said housing to form a substantially enclosed container for a plurality of slide transparency units received therein;
      means defining an exit slot in one of said cover end walls through which the unexposed transparency units are sequentially transportable from said cartridge for exposure and for having their processing initiated by the camera;
      means defining a receiving slot in the other of said cover end walls for receiving exposed and processed transparency units for storage in said cartridge; and
   resilient means for urging the stack of unexposed transparency units toward said opening.

5. A cartridge as set forth in claim 4 wherein: said abutment means includes flanges extending inwardly from said housing sidewalls to define said opening.

6. A cartridge as set forth in claim 4, wherein said exit and receiving slots are in a nonopposing relationship in said cover end walls, and said cartridge further includes: a divider within said cartridge engageable with said resilient means and located between said receiving slot and said exit slot to divide said cartridge into a supply chamber for containing unexposed transparency units and a storage chamber for containing exposed and processed transparency units, said resilient means urging said divider toward said receiving slot.

7. A cartridge as set forth in claim 6 further including: deflection means within said cover adjacent to said receiving slot for deflecting the leading end of an exposed and processed transparency unit inserted through said receiving slot toward said divider and for maintaining the trailing end of said inserted transparency unit away from said receiving slot to facilitate the insertion of a succeeding exposed and processed transparency unit through said receiving slot.

8. A cartridge as set forth in claim 7 wherein said deflection means includes: a rib extending transversely across said cover top wall adjacent to said receiving slot.

9. A cartridge as set forth in claim 7 wherein said deflection means includes: a lug depending from said cover top wall adjacent to said receiving slot and having a cam surface engageable by said leading end of said inserted transparency unit to deflect said transparency unit.

10. A cartridge as set forth in claim 4 further including: light-lock means within said cartridge forming a closure for said opening for preventing light from entering said cartridge prior to insertion of said cartridge in the camera.

11. A cartridge as set forth in claim 10 wherein said light-lock means includes: a first blank within said cartridge; and said cartridge further includes: a second blank between said first blank and said resilient means for maintaining the stack of unexposed transparency units between said first blank and said resilient means and for pushing the last of the unexposed transparency units out of the camera upon movement of said second blank through said exit slot.

12. A cartridge as set forth in claim 11 further including: a pressure pad within said cartridge between said second blank and said resilient means, said pressure pad having upturned ends to prevent movement thereof through said exit slot.

13. A cartridge as set forth in claim 11 wherein said light-lock means further includes:
a first baffle at an end portion of said first blank adjacent to said exit slot; and
a second baffle at an opposite end portion of said first blank.

14. A cartridge as set forth in claim 13 wherein each of said first and second baffles includes:
an angular member having:
a first flange attached to said first blank; and
a second flange extending perpendicularly from said first blank and foldable against said first blank upon engagement of said second flange by an edge of said exit slot so that only a single thickness of each baffle passes through said exit slot.

15. A cartridge as set forth in claim 11 wherein:
said end wall of said housing includes a notch adjacent to said opening to facilitate movement of the camera reciprocative mechanism; and
a tab extending from an end portion of said first blank is engageable with an edge of said notch, the opposite end portion of said first blank being engageable with an edge of said exit slot so that said first blank is retained against movement toward said second blank in order to prevent crushing of the unexposed transparency units prior to insertion of said cartridge in the camera.

16. A cartridge as set forth in claim 15 wherein: an end wall of said cover includes a notch coterminous with said housing end wall notch to facilitate movement of the camera reciprocative mechanism.

17. A cartridge for supplying to a camera a stack of unexposed slide transparency units which are adapted to be exposed and to have their processing initiated by the camera, the camera having a reciprocative mechanism adapted to sequentially transport the unexposed transparency units from said cartridge to an exposure chamber in the camera, said cartridge comprising:
a housing including:
generally parallel housing sidewalls;
a housing end wall interconnecting said housing sidewalls; and
flanges extending inwardly from at least two of said housing walls to support a stack of unexposed slide transparency units in said cartridge and defining an opening in said housing through which the reciprocative mechanism in the camera is adapted to extend to sequentially transport the unexposed transparency units from said cartridge to the exposure chamber in the camera; a cover to substantially enclose slide transparency units in said cartridge including:
two spaced, generally rectangular, cover sidewalls;
two spaced, generally rectangular, cover end walls interconnecting said cover sidewalls;
a cover top wall interconnecting said cover sidewalls and said cover end walls, said cover being connectable in one orientation with said housing to form a substantially enclosed container for slide transparency units therein;
means defining an exit slot in one of said cover end walls, spaced from said cover top wall, through which unexposed transparency units are adapted to be sequentially transported from said cartridge to the camera exposure chamber;
means defining a receiving slot in the other of said cover end walls adjacent to said cover top wall for receiving exposed and processed transparency units for storage in said cartridge; and
a spring within said cover to urge the stack of unexposed transparency units toward said opening; and a divider within said cover between said spring and said cover top wall to divide said cartridge into a supply chamber for containing the stack of unexposed transparency units to be sequentially transported through said exit slot and a storage chamber for containing exposed and processed transparency units inserted through said receiving slot.

18. A cartridge as set forth in claim 17 wherein said cover is connectable in another orientation with said housing after removal of said cartridge from the camera, in which other orientation said exit slot in said one cover end wall abuts said housing end wall and said cartridge is thereby substantially enclosed to serve as a storage container for exposed and processed transparency units.

19. A cartridge as set forth in claim 17 wherein said housing further includes: a housing top wall interconnecting said housing sidewalls and said housing end wall, said housing sidewalls and housing top wall defining an open end of said housing opposite said housing end wall, through which open end said cover is insertable in said housing to effect assembly of said cartridge.

20. A cartridge as set forth in claim 18 wherein said housing further includes: means defining a receiving slot in said housing end wall alineable with said receiving slot in said other cover end wall when said cover is connected in said one orientation with said housing.

21. A cartridge as set forth in claim 17 wherein said housing further includes: means defining an open top of said housing opposite said opening, through which open top said cover is insertable in said housing to effect assembly of said cartridge.

22. A cartridge for supplying a stack of unexposed radiation-sensitive units to an exposing device, said cartridge comprising:
a container including means for supporting a stack of radiation-sensitive units in said container;
means for providing access to the supported stack;
means defining an exit opening in said container through which units in the stack can be sequentially removed from said container;
a light shield within said container, said light shield being removable for closing said access and said exit opening to the passage of light therethrough;
a wall portion and a top portion;
wherein said supporting means is disposed opposite and spaced from said top portion, wherein said access providing means includes an access opening in said container adjacent to said supporting means, and wherein said exit opening is at least partially defined by said wall portion; and
means defining a storage chamber in said container to receive and store the radiation-sensitive units after they have been exposed.

23. A cartridge as set forth in claim 22 further comprising follower means in said container for riding on and following the stack of radiation-sensitive units so as to be removed from said container after the last unit in the stack has been moved from the container and thereby to push the last unit out of the exposing device.

24. A cartridge as set forth in claim 22 further comprising resilient means in said container for urging the stack of radiation-sensitive units toward said supporting means.

25. A cartridge as set forth in claim 22 wherein said container further includes means defining a receiving opening communicating with said storage chamber through which exposed units can be inserted for storage.

26. A cartridge as set forth in claim 25, wherein said storage chamber defining means includes a divider disposed in said container between said receiving opening and said exit opening so as to divide said container into said storage chamber for storing exposed units and a supply chamber for containing the stack of radiation-sensitive units to be supplied to the exposing device.

27. A cartridge as set forth in claim 26 further comprising resilient means disposed in said container between said divider and the stack of radiation-sensitive units for urging said divider toward said receiving opening and for urging the stack toward said exit opening.

28. A cartridge for supplying a stack of radiation-sensitive units to an exposing device that has a reciprocative mechanism adapted to sequentially transport such units from said cartridge to an exposure position in the device, said cartridge comprising:
  a. a container including;
    1. a top portion;
    2. a wall portion disposed at an angle with respect to said top portion;
    3. means opposite and spaced from said top portion for supporting a stack of radiation-sensitive units in said container;
    4. means including an access opening in said container adjacent to said supporting means for providing access to the supported stack by the reciprocative mechanism in the exposing device;
    5. means at least partially provided by said wall portion defining an exit opening through which units in the stack can be sequentially removed from said container by the reciprocative mechanism; and
    6. means spaced from said exit opening defining a receiving opening through which exposed units can be inserted for storage in said container;
  b. follower means disposed in said container for riding on and following the stack of radiation-sensitive units so as to be transported from said container by the reciprocative mechanism after the last unit in the stack has been moved from the container to the exposure position and thereby to push the last unit from the exposure position and out the exposing device;
  c. divider means disposed in said container between said exit opening and said receiving opening for dividing said container into a supply chamber for containing the stack of radiation-sensitive units to be supplied sequentially through said exit opening to the exposing device and a storage chamber for storing exposed units inserted through said receiving opening; and
  d. resilient means disposed in said container between said follower means and said divider means for urging said follower means and the stack of radiation-sensitive units toward said exit opening and for urging said divider means and any inserted exposed units toward said receiving opening.